July 8, 1969    J. P. BELL    3,454,757
AUTOMOTIVE SIDE-MARKER LAMPS

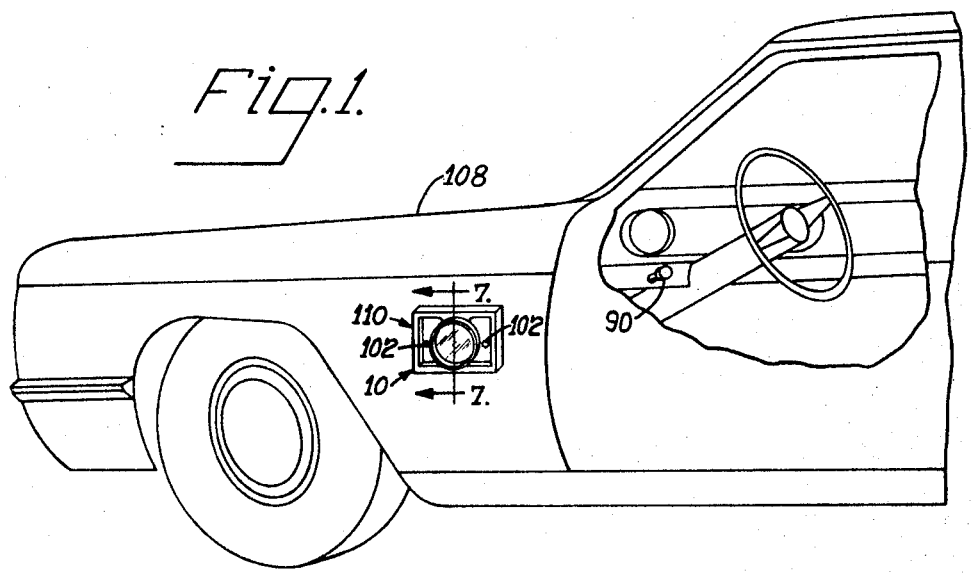
Fig.1.
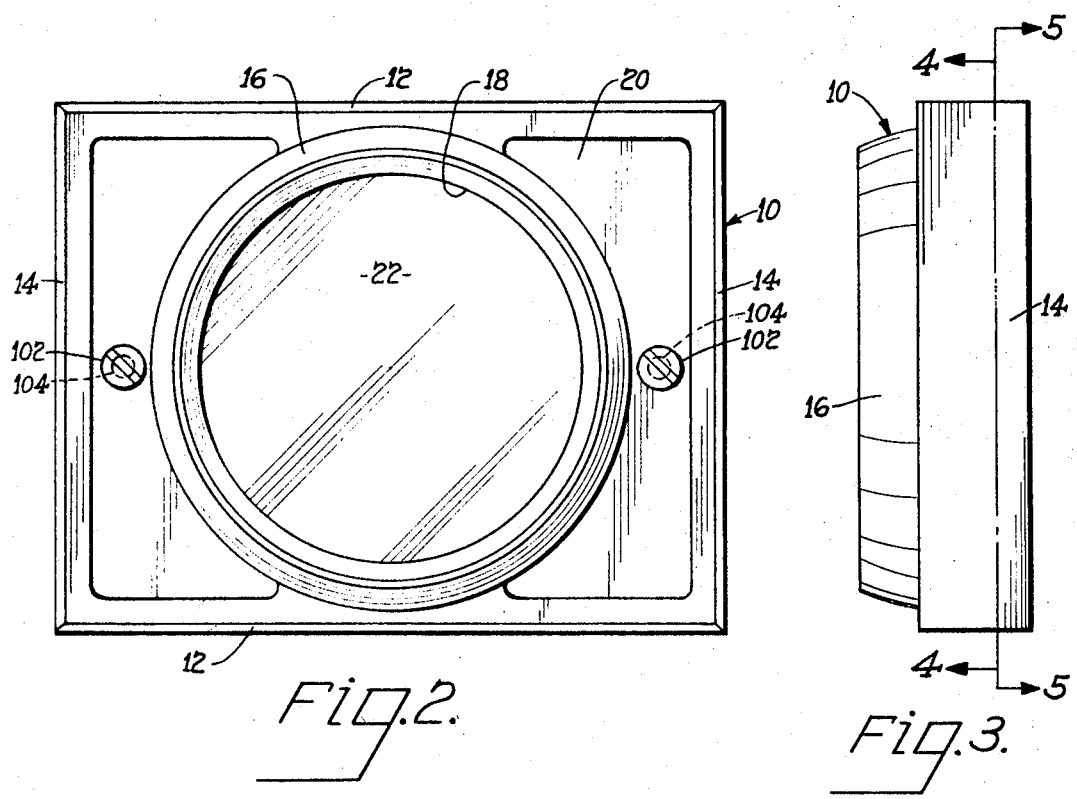
Fig.2.
Fig.3.
INVENTOR.
Joseph P. Bell
BY
ATTORNEY

Filed Feb. 2, 1966    Sheet 2 of 2

INVENTOR.
Joseph P. Bell
BY
ATTORNEY

United States Patent Office 3,454,757
Patented July 8, 1969

---

3,454,757
AUTOMOTIVE SIDE-MARKER LAMPS
Joseph P. Bell, Maple Heights, Ohio, assignor to Design Progress Inc., Maple Heights, Ohio, a corporation of Ohio
Filed Feb. 2, 1966, Ser. No. 524,557
Int. Cl. B60q 1/32
U.S. Cl. 240—8.2                              8 Claims

ABSTRACT OF THE DISCLOSURE

A warning light adapted for mounting on the side of an automotive vehicle. The body of the lamp is composed of a cup-shaped housing having a wall bounded by reinforcing edge members whereby the wall is spaced outwardly from the vehicle. An opening is provided in the wall with a lens mounted across the opening. The lamp is carried by the backing plate which is adapted to be disposed within the reinforcing edge members, seated on an inner peripheral step therein. The entire unit is then secured to the side of the vehicle.

---

This invention relates to lamps, and relates more particularly to a side-marker and guard lamp for automotive vehicles. Still further this invention relates to a side marker lamp that can be either operated independently, as from a switch or the like on the dash, or simultaneously with an automobile headlight system.

Those skilled in the art will readily understand that while automobile lights have been used to light the way in front of vehicles to thereby provide drivers with visibility for forward travel and tail or rear warning lights have been used on vehicles to warn those approaching from the rear of the vehicle's presence and back-up lights have been used to facilitate after dark rearward maneuvering of the vehicle, that lighting devices to mark or illuminate the side of a vehicle have not been used.

The present invention provides such devices and ensures passing safety. It is well known that when one automobile passes another, there is a blind spot for the driver being passed, just as the overtaking automobile moves by the left rear corner of the vehicle. By the present invention a warning light becomes visible to both drivers during the passing maneuver as the vehicles are side by side, and thus during the period when under similar conditions with the use of prior art devices a blind spot would occur, passing visibility is provided by the invention permitting both drivers to maintain proper passing clearance.

Further, by the present invention cornering is made safer. Cornering lights at the ends of the front bumper are now being featured on some American automobiles. These put a white light at the very front corners of the car. When the vehicle is well into the turn these do not show at the sides, as where an object might be struck. By the present invention a light is located on opposite sides of the vehicle between the front wheels of the car forward of the front door. Thus the driver of the car is able to see an obstruction all the way through the turn, as compared to mere partial visibility provided by the front end cornering lights of the present state of the art.

It is accordingly an important object to provide a novel warning light.

A further object is to provide a novel passing and cornering light for an automotive vehicle.

The present invention is described in relationship to a passenger car. However, the extended scope of the invention includes substantially any maneuverable vehicle such as car, truck, bus and the like where passing and cornering are characteristically encountered during the operation of the vehicle.

Other objects of this invention will appear in the following description and appended claims reference being made to the accompanying drawings.

FIGURE 1 is a fragmentary perspective illustration of the present invention as applied to the front fender of a passenger car;

FIGURE 2 is a front elevational view of the lamp of the present invention;

FIGURE 3 is a side elevational view of the lamp of FIGURE 2;

Figure 6:
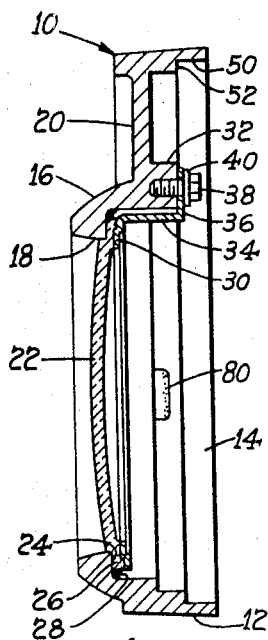
FIGURE 6 is a sectional view taken along the line 6—6 of FIGURE 4.

It is to be understood that this invention is not limited in application to the details of construction and arrangement of parts illustrated in he drawings, since the invention is subject to logical extension. The terminology employed is for the purpose of description and not of limitation.

The main housing

This unit is designated by the reference numeral 10 on the drawings and is preferably a chromium plated, diecast metal member. Suitably the housing 10 is of rectangular configuration as illustrated; however, this is not to be considered limiting. The housing 10 as illustrated comprises a pair of longitudinal reinforcing edge members 12 and lateral reinforcing edge members 14. Members 12 and 14 are integrally cast and thus form a unitary substantially rectangular frame or reinforcement around the rectangular main housing unit. An annular ring member 16 is shown surrounding a circular opening 18 positioned centrally of the main housing 10. The annular ring member 16 protrudes outwardly of and is formed integrally with the longitudinal edge members 12 as shown. A substantially recessed flat plate-like wall 20 fills the area between the periphery of the annular ring member 16, the longitudinal edge members 12 and the lateral edge members 14, further strengthening the unit.

The lens

Figure 7:
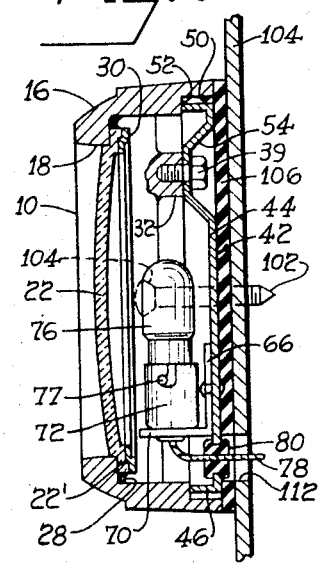
FIGURE 7 is a sectional view taken along the line 7—7 of FIGURE 1.

The back of the annular ring member 16, as shown in FIGURES 6 and 7 accommodates a lens unit 22. In the preferred form, the lens consists of an amber plastic reflex-reflector element having an effective diameter of 3″ backed with a clear plastic disc of 2 and ¾″ diameter. The reflex-reflector element occupies the opening 18 in the center of the rectangular shaped housing 10. The manner in which the annular ring member 16 is recessed to provide a shoulder 24 for retaining the lens is shown in FIGURES 6 and 7. The lens unit 22 is provided with a peripheral lip 26 conforming to the annular shoulder 24. A bead 28 on the inner face of the lens is preferably of waterproof mastic providing a weatherproof seal around the periphery of the lens unit 22, between it and the annular ring member 16.

The material used in the lens in Rohm & Haas Plexiglas V-883 (amber). Compliance of this material with the requirements of the SAE recommended practice J576a is substantiated by independent laboratory reports.

The lens retainer

The lens unit 22, as best illustrated in FIGS. 6 and 7, is provided with an inner peripheral step as shown at 22' and to hold the said lens in place a ring member 30 is provided which is stepped to conform intimately to the peripheral step 22' of the lens unit 22, thereby providing positive contact to securely hold the lens in place, particularly in combination with the cement bead 28, assuring the maintenance of a weatherproof seal throughout the life of the unit.

Figure 4:
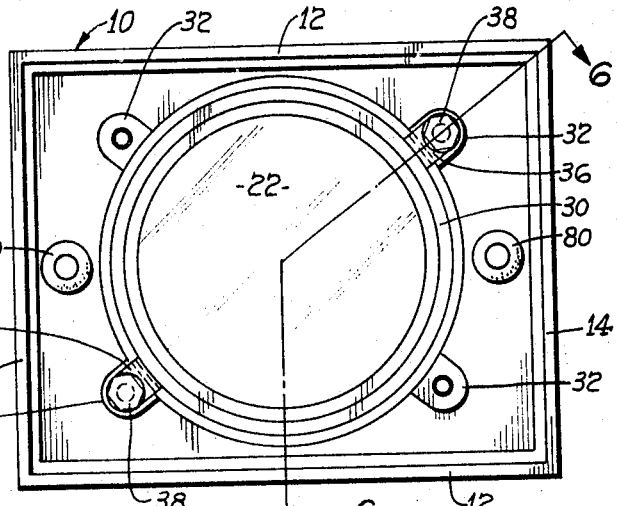
FIGURE 4 is a rear elevational view taken along the line 4—4 of FIGURE 3, and with the backing plate removed.

As best shown in FIGS. 4 and 6, screw lugs 32, of which four are shown, are spaced around the back of the annular ring member 16 of the main housing 10. Two of these lugs 32, it will be observed, are used to hold the lens retainer ring 30 against the lens. The lens retainer rings 30 includes a pair of transversely extending bracket members 34 having outwardly extending attachment tabs 36. Self-tapping screws 38 with integral washers 40 are passed through holes in the attachment tabs 36 and thread into the screw lugs 32.

The backing plate

Figure 5:
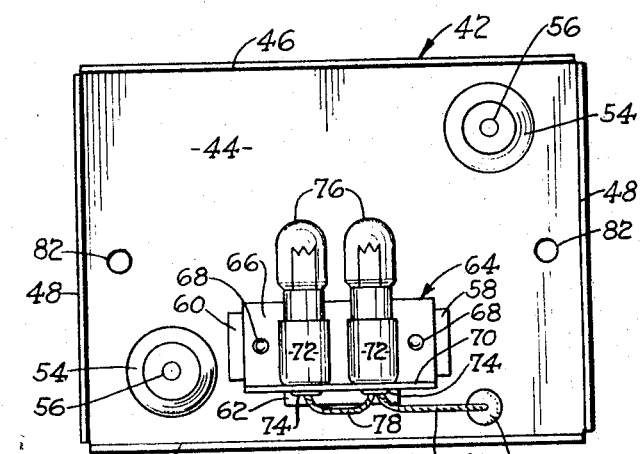
FIGURE 5 is an elevational view taken along the line 5—5 of FIGURE 3, showing the inside of the backing plate.

This is designated by the reference numeral 42 and is shown in FIGS. 5 and 7. Centrally, the backing plate 42 comprises a flat plate like body 44 having approximately 90° outwardly extending longitudinal edge flanges 46 and transverse edge flanges 48. As shown in FIG. 7, a rabbet-like recess 50, including a shoulder 52, is provided all around the rear edge of the main housing 10 to accommodate the backing plate 42. The edge flanges 46 and 48 about the shoulder 52 for proper orientation and alignment of the component parts of the unit with one another.

The backing plate 42 is held in assembled relationship to the main housing 10 by means of two hexhead screws 39, FIGURE 7. These are run into the other two screw lugs 32. The plate-like body 44 is dimpled or provided with an offset inwardly at 54 to provide mounting pads with centrally located holes 56 therein through which the hexhead screws 39 are passed for assembly.

Lamp mounting

As shown in FIGURE 5, the lower portion of the plate-like body 44 of the backing plate 42 is provided with two opposed and vertically oriented, inwardly dimpled indexing tabs 58 and 60. Centrally and horizontally disposed between the tabs 58 and 60 is a bottom index tab 62.

A lamp mounting bracket 64 is accommodated between the index tabs 58, 60 and 62. The lamp mounting bracket 64 includes a main plate 66 that is embraced on three sides by the said index tabs 58, 60 and 62. Grounding rivets 68 are passed through aligned openings in the main plate 66 and the plate body 44 of the backing plate 42 to provide assembly. Cement is optionally employed for a weather-proof seal.

Extending transversely of the main plate 66 is a lamp mounting ledge 70. Two single-contact socket assemblies 72, for the miniature bayonet base bulbs used as the lighting device for the assembly in the forms shown are crimped into two side-by-side openings in the lamp mounting ledge 70 so that they lie parallel to the plate-like body 44 of backing plate 42. The roll-over crimp fastenings are indicated at 74. The position of the sockets 72 allows the filaments of the bulbs 76 to lie in the center of lens 22. The wire 78 from the sockets 72 is guided through the plate body 44 by a rubber grommet 80. It is to be understood that other light means could be employed and/or mounting therefor without departing from the invention concept hereof.

Maximum light output is assured by the high quality material of the lens unit 22 and the reflective surface, such as aluminum or the like, provided by the plate-like body 44 of the backing plate 42. An effective reflector is established in an economical manner.

The electrical circuit

Figure 8:
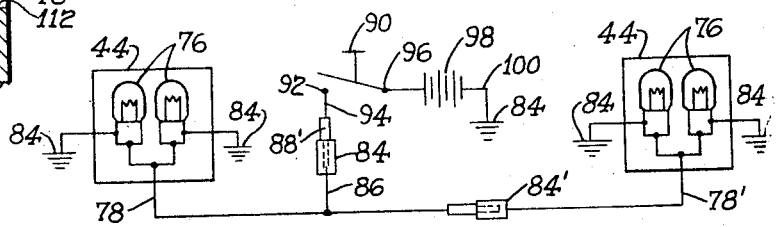
FIGURE 8 is a schematic wiring diagram of the invention.

This is shown in FIGURE 8 of the drawings. Each of the bulbs 76 is grounded as at 84. The bulbs 76 are of the miniature bayonet base-type, as described, having a retainer lug 77 on the side of the base that locks into a retainer notch in the socket assembly 72, FIGURE 7. This provides a connection to the ground 84 as indicated in FIGURE 8. The single contact on the bottom of each bulb is insulated from the base and is connected to the wire 78, designated as such in FIGURE 8. The wire 78 includes a female bayonet socket 84 at the end of a connecting branch wire 86 and a male bayonet lug at the terminal end of wire 78. This mates with the female bayonet socket 84' providing a connection by means of a wire 78' to a second unit, providing a pair, one on each side of the vehicle, as indicated in FIGURE 1.

A switch 90 has one terminal 92 connected by means of a wire 94 through a female bayonet socket 84 receivably holding the male bayonet lug 88'. The other terminal 96 is connected to the battery 98. This can be connected to the positive terminal of the battery, the positive terminal of the voltage regulator, or the alternator as desired. The battery 98 is grounded by means of a wire 100 to the ground 84 or frame of the vehicle to thereby complete the circuit. When the switch 90, which is shown as mounted on the dash of the vehicle, is closed all bulbs 76 will be turned on.

In the above installation, the wiring harness would include a fuse for protection of the side marker lamp system in the event of accidental short circuit.

Alternately the present invention can be wired directly into the headlight circuit of the automobile by simply attaching the line 86 or 94 to the positive side of the light switch. By so operating, the present invention will be operable simultaneously at all times when the headlights are turned on. The integral system of FIGURE 8 provides independent operation or simultaneous operation with the headlights at the discretion of the vehicle operator.

Mounting the unit to the vehicle

This is shown in FIGS. 1 and 7. The entire system comprises a pair of oppositely disposed aligned side-marker light units 110 and a complete wire harness including switch and fuse. Each light unit 110 is mounted on the body of the vehicle as shown between the front wheel cut-out and the front door and is preferably at a height as illustrated rather high up on the side of the fender. The wire 78, 78' from each unit runs into the engine compartment where it hooks into the rest of the harness for electrical power. Each unit 110 grounds through the body of the car. A flat portion of the car body is used for mountitng. Preferably, three holes are provided in the car body at the position selected by means of a template. The template corresponds to FIG. 5 and the holes mate the two screw holes 82, and the rubber grommet 80. The wiring hole is shown at 112 in FIG. 7 to accommodate the wire 78. As shown in FIGURES 1, 2 and 7 a screw 102 is passed through counter sunk hole 104 in wall 20, through the holes 82 in the backing plate 42 and into the sheet metal 104 of the automobile. Two such mounting screws 102, as indicated in FIGS. 1 and 2 are utilized. As shown in FIGS. 4 and 6, rubber grommets 80 are cemented to the back of the wall 20 to embrace the screws 102 and thereby provide a weather-tight seal. Washers (not shown) may also be used slidably mounted on the screws before insertion of the screws into the face of the lens cover 10.

A weather seal between the main housing 10, the backing plate 42 and the body sheet metal 104 is provided by means of a flat generally rectangularly shaped sheet rubber gasket 106 conforming in outline to the housing 10, FIGURE 7.

The wiring connections are made in accordance with the schematic diagram of FIGURE 8 with the switch 90 appropriately mounted on the instrument panel, or alternately with the wiring tied into the headlight switch for the automobile 108 of FIGURE 1.

*Operation*

From the prior description and by viewing FIGURE 1, the operation of the present invention is as follows: With the lamp unit 110 turned on by means of the switch 90 at the dash, light is directed transversely from each side of the automobile, well behind the headlights and well forward of the tail lights. Thus, the blind spot on passing is eliminated with an automobile equipped with this invention. Further, improved cornering light is provided all the way through the corner rather than just part way as in the prior art. Furthermore, where an amber lens is used, further safety is provided by the amber color of the lens units 22, conforming to SAE specifications for warning lights.

Advantages inherent in the present invention are resistance to corrosion, adequate light output, resistance of lens warpage under ambient operating conditions, resistance to vibration as proved by no mechanical or electrical failures under SAE tests, and resistance to ambient moisture and dust. Accordingly, a long life and dependable unit is provided.

While I have described my invention in connection with preferred embodiments, I am, nevertheless, aware that numerous and extensive departures, as for instance in size, shape, materials etc. could be made without departing from the spirit of my invention or the scope of the appended claims.

What I claim is:

1. In a warning light for an automotive vehicle, a housing having a wall bounded by reinforcing edge members, extending generally transversely of said wall, an opening in said wall, a lens mounted against said wall within the opening, means holding said lens in said mounted position, a backing plate, means holding said backing plate against said housing, a lamp mounting bracket secured to said backing plate, a lamp positioned thereon, means for conducting electrical power to said lamp filament, mounting means securing said light on an upper side of the vehicle between a front wheel and the front door on the said side; said housing including a screw lug on the interior surface, and said means connecting said lens and said housing comprising an annular-shaped retainer in contacting relationship with the back peripheral surface of said lens, and a fastening tab connected to said annular retainer and said screw lug.

2. A warning light for mounting on an automotive vehicle, said light comprising a housing having a wall bounded by reinforcing edge portions extending laterally of said wall and adapted to be directed toward and disposed adjacent the vehicle whereby said wall is spaced outwardly from the vehicle; an opening in said wall; said wall having an inner peripheral step around said opening; a lens seated within said step and positioned across said opening; means retaining said lens in mounted position; a backing plate disposed within said edge portions in spaced relation to said lens and secured to said wall; said reinforcing edge portion having inwardly projecting shoulder means; said shoulder means overlapping portions of said backing plate to retain said plate in fixed position; lamp means carried by said backing plate between said plate and said lens; means for conducting electrical current to said lamp means; and means for securing said warning light to a vehicle.

3. A warning light as set forth in claim 2, said wall of said housing having screw lugs projecting inwardly of the housing radially outwardly of said lens; and screw means extending through said backing plate and engaging at least certain of said screw lugs to secure said plate to said wall.

4. A warning light for mounting on an automotive vehicle, said light comprising a housing having a wall bounded by reinforcing edge portions extending laterally of said wall and adapted to be directed toward and disposed adjacent the vehicle whereby said wall is spaced outwardly from the vehicle; an opening in said wall; a lens mounted against said wall inwardly thereof and positioned across said opening; means retaining said lens in mounted position; a backing plate disposed within said edge portions in spaced relation to said lens and secured to said wall; lamp means carried by said backing plate between said plate and said lens; means for conducting electrical current to said lamp means; means for securing said warning light to a vehicle, said reinforcing edge portions having inwardly projecting shoulder means at inner surface portions thereof; and said backing plate having edge flanges projecting laterally generally in the opposite direction from said edge portions and seated on said shoulder means to maintain said plate in fixed, spaced relation to said lens.

5. A warning light for mounting on an automotive vehicle, said light comprising a housing having a wall bounded by reinforcing edge portions extending laterally of said wall and adapted to be directed toward and disposed adjacent the vehicle whereby said wall is spaced outwardly from the vehicle; an opening in said wall; a lens mounted against said wall inwardly thereof and positioned across said opening; means retaining said lens in mounted position; a backing plate disposed within said edge portions in spaced relation to said lens and secured to said wall; lamp means carried by said backing plate between said plate and said lens; means for conducting electrical current to said lamp means; means for securing said warning light to a vehicle, said lamp means including a bracket adapted to be secured against the inner surface of said backing plate; and said backing plate having tab means projecting inwardly therefrom for locating at least three border portions of said bracket with respect to said backing plate.

6. A warning light for mounting on an automotive vehicle, said light comprising a housing having a wall bounded by reinforcing edge portions extending laterally of said wall and adapted to be directed toward and disposed adjacent the vehicle whereby said wall is spaced outwardly from the vehicle; an opening in said wall; a lens mounted against said wall inwardly thereof and positioned across said opening; means retaining said lens in mounted position; a backing plate disposed within said edge portions in spaced relation to said lens and secured to said wall; lamp means carried by said backing plate between said plate and said lens; means for conducting electrical current to said lamp means; means for securing said warning light to a vehicle, said means retaining said lens comprising an annular retainer overlying inner peripheral surface portions of said lens; said wall of said housing having screw lugs projecting inwardly of the housing radially outwardly of said lens; said retainer having portions overlying said screw lugs; and screw means extending through said retainer portions and engaging at least certain of said screw lugs to securely mount said lens to said housing wall.

7. A warning light for mounting on an automotive vehicle, said light comprising a housing having a wall bounded by reinforcing edge portions extending laterally of said wall and adapted to be directed toward and disposed adjacent the vehicle whereby said wall is spaced outwardly from the vehicle; an opening in said wall; a lens mounted against said wall inwardly thereof and positioned across said opening; means retaining said lens in mounted position; a backing plate disposed within said edge portions in spaced relation to said lens and secured to said wall; lamp means carried by said backing plate between said plate and said lens; means for conducting electrical current to said lamp means; means for securing said warning light to a vehicle, said lens having an outer peripheral edge portion provided with annular step portions at the inner and outer surfaces of said lens; said wall having an annular ring member surrounding said opening and affording an annular edge for seating the outer annular step portion of said lens; said means retaining said lens comprising an annular retainer overlying the step portion at the inner surface of the lens, said retainer having an annular step interfitting the inner step of said lens; and means securing said annular retainer to said wall of said housing.

8. A warning light for mounting on an automotive vehicle, said light comprising a cup-shaped housing having an integral wall and laterally projecting edge portions adapted to be disposed adjacent to the vehicle to space the wall outwardly from the vehicle; an opening in the wall; a lens seated across said opening inwardly of the housing; a plurality of integral screw lugs projecting inwardly from said wall and circumferentially and radially outwardly spaced with respect to said opening; said edge portions having inwardly directed shoulders at the inner surfaces thereof recessed inwardly of the housing away from the distal edges of said edge portions; a backing plate having laterally directed edge flanges the distal edges of which seat on said shoulders; an annular retainer engaging inner edge surface portions of the lens and having radially outwardly directed tabs; screw means extending through said backing plate and said tabs, each said screw means engaging one of said screw lugs to secure said retainer and backing plate to said housing wall; and lamp means disposed between said backing plate and said lens.

References Cited
UNITED STATES PATENTS

| | | | |
|---|---|---|---|
| 3,235,721 | 2/1966 | Dickson | 240—8.2 |
| 2,003,804 | 6/1935 | Falge | 240—8.3 |
| 2,184,208 | 12/1939 | Brown et al. | 240—8.2 |
| 2,193,063 | 3/1940 | Dettweiler | 240—8.2 |
| 3,032,644 | 5/1962 | McGrew | 240—7.1 |

FOREIGN PATENTS 622,398  6/1961  Italy.

NORTON ANSHER, *Primary Examiner.*

CHARLES B. FUNK, *Assistant Examiner.*

U.S. Cl. X.R.

240—8.1